(12) United States Patent
Hefetz

(10) Patent No.: US 7,531,807 B2
(45) Date of Patent: May 12, 2009

(54) METHODS AND SYSTEMS FOR AUTOMATIC BODY-CONTOURING IMAGING

(75) Inventor: Yaron Hefetz, Herzeliya (IL)

(73) Assignee: GE Medical Systems Israel, Ltd., Tirat Hacarmel (IL)

( * ) Notice: Subject to any disclaimer, the term of this patent is extended or adjusted under 35 U.S.C. 154(b) by 0 days.

(21) Appl. No.: 11/335,214

(22) Filed: Jan. 19, 2006

(65) Prior Publication Data
US 2007/0176106 A1 Aug. 2, 2007

(51) Int. Cl.
*G01T 1/161* (2006.01)

(52) U.S. Cl. .............................. 250/363.02; 250/363.04

(58) Field of Classification Search ............ 250/363.02, 250/363.04
See application file for complete search history.

(56) References Cited

U.S. PATENT DOCUMENTS

| | | | | |
|---|---|---|---|---|
| 4,582,995 A * | 4/1986 | Lim et al. | ............... | 250/363.07 |
| 5,072,121 A * | 12/1991 | Jazbec | ................... | 250/363.04 |
| 5,319,205 A * | 6/1994 | Kline et al. | ............ | 250/363.04 |
| 5,376,796 A * | 12/1994 | Chan et al. | ............. | 250/363.04 |
| 5,486,700 A | 1/1996 | Silberklang et al. | | |
| 5,691,538 A * | 11/1997 | Ohike et al. | ........... | 250/363.05 |
| 5,777,332 A * | 7/1998 | Lonn et al. | ............. | 250/363.04 |
| 6,180,943 B1 * | 1/2001 | Lange | ................... | 250/363.05 |
| 6,211,523 B1 | 4/2001 | Gagnon | | |
| 6,405,072 B1 * | 6/2002 | Cosman | ...................... | 600/426 |
| 6,662,036 B2 * | 12/2003 | Cosman | ...................... | 600/411 |
| 2004/0054248 A1 * | 3/2004 | Kimchy et al. | ................. | 600/3 |
| 2006/0108532 A1 * | 5/2006 | Ohana et al. | ........... | 250/363.04 |

* cited by examiner

*Primary Examiner*—David P Porta
*Assistant Examiner*—Shun Lee
(74) *Attorney, Agent, or Firm*—The Small Patent Law Group; Dean D. Small

(57) ABSTRACT

Methods and systems for imaging a patient using an imaging system is provided. The method includes rotating a detector about a patient, detecting a predetermined distance of the detector from the patient, and automatically moving the detector to within a predetermined range of distance from the patient based on the detected distance.

24 Claims, 9 Drawing Sheets

| | Sensors | | | Limit | Motion | | Comments |
|---|---|---|---|---|---|---|---|
| | Sensor 500 (902) | Sensor 502 (904) | Rotor Position (906) | Lateral or Radial Range Limits the Motion? (908) | Gamma Cameras (910) | Table (912) | (914) |
| 1 | OK | OK | X | X | No | No | Basic Motions, No Limit Activated |
| 2 | N | OK or F | X | No | 78 Away | No | |
| 3 | F | OK or F | X | No | 78 Towards | No | |
| 4 | OK or F | N | X | No | 80 Away | No | |
| 5 | OK or F | F | X | No | 80 Towards | No | |
| 6 | N | N | X | No | Lateral Out | No | Faster Response, No Limit Activated |
| 7 | F | F | X | No | Lateral In | No | |
| 8 | N | F | X | No | Sideways Right | No | |
| 9 | F | N | X | No | Sideways Left | No | |
| 10 | N | OK, N | Above | Yes | No | Down | Rotor Above Patient |
| 11 | F | OK, F | Above | Yes | No | Up | |
| 12 | OK, N | N | Above | Yes | No | Down | |
| 13 | OK, F | F | Above | Yes | No | Up | |
| 14 | N | OK, N | Below | Yes | No | Up | Rotor Below Patient |
| 15 | F | OK, F | Below | Yes | No | Down | |
| 16 | OK, N | N | Below | Yes | No | Up | |
| 17 | OK, F | F | Below | Yes | No | Down | |
| 18 | N | F or OK | Right | Yes | No | Down | Rotor Right of Patient (If both Detectors are "F", Lateral in is Unlikely to be at Limit.) |
| 19 | F | OK | Right | Yes | No | Up | |
| 20 | F or OK | N | Right | Yes | No | Down | |
| 21 | OK | F | Right | Yes | No | Up | |
| 22 | N | F or OK | Left | Yes | No | Up | Rotor left of Patient (If both Detectors are "F", Lateral in is Unlikely to be at Limit.) |
| 23 | F | OK | Left | Yes | No | Down | |
| 24 | F or OK | N | Left | Yes | No | Down | |
| 25 | OK | F | Left | Yes | No | Up | |

N= Near Proximity Sensor is Actuated.
F= Far Proximity Sensor is Actuated.
OK=Near Proximity Sensor is not Actuated and Far Proximity Sensor is Actuated.
X= DON'T CARE Condition, or any Condition.

| | Sensors | | | Limit | Motion | | Comments |
|---|---|---|---|---|---|---|---|
| | Sensor 500 | Sensor 502 | Rotor Position | Lateral or Radial Range Limits the Motion? | Gamma Cameras | Table | |
| 1 | OK | OK | X | X | No | No | Basic Motions, No Limit Activated |
| 2 | N | OK or F | X | No | 78 Away | No | |
| 3 | F | OK or F | X | No | 78 Towards | No | |
| 4 | OK or F | N | X | No | 80 Away | No | |
| 5 | OK or F | F | X | No | 80 Towards | No | |
| 6 | N | N | X | No | Lateral Out | No | Faster Response, No Limit Activated |
| 7 | F | F | X | No | Lateral In | No | |
| 8 | N | F | X | No | Sideways Right | No | |
| 9 | F | N | X | No | Sideways Left | No | |
| 10 | N | OK, N | Above | Yes | No | Down | Rotor Above Patient |
| 11 | F | OK, F | Above | Yes | No | Up | |
| 12 | OK, N | N | Above | Yes | No | Down | |
| 13 | OK, F | F | Above | Yes | No | Up | |
| 14 | N | OK, N | Below | Yes | No | Up | Rotor Below Patient |
| 15 | F | OK, F | Below | Yes | No | Down | |
| 16 | OK, N | N | Below | Yes | No | Up | |
| 17 | OK, F | F | Below | Yes | No | Down | |
| 18 | N | F or OK | Right | Yes | No | Down | Rotor Right of Patient (If both Detectors are "F", Lateral in is Unlikely to be at Limit.) |
| 19 | F | OK | Right | Yes | No | Up | |
| 20 | F or OK | N | Right | Yes | No | Down | |
| 21 | OK | F | Right | Yes | No | Up | |
| 22 | N | F or OK | Left | Yes | No | Up | Rotor left of Patient (If both Detectors are "F", Lateral in is Unlikely to be at Limit.) |
| 23 | F | OK | Left | Yes | No | Down | |
| 24 | F or OK | N | Left | Yes | No | Down | |
| 25 | OK | F | Left | Yes | No | Up | |

N= Near Proximity Sensor is Actuated.
F= Far Proximity Sensor is Actuated.
OK= Near Proximity Sensor is not Actuated and Far Proximity Sensor is Actuated.
X= DON'T CARE Condition, or any Condition.

FIG. 9

METHODS AND SYSTEMS FOR AUTOMATIC BODY-CONTOURING IMAGING

BACKGROUND OF THE INVENTION

This invention relates generally to imaging systems, and more particularly to methods and apparatus for performing automatic body-contouring imaging.

Diagnostic nuclear imaging is used to study radionuclide distribution in a subject, such as a patient. Typically, one or more radiopharmaceuticals or radioisotopes are injected into the subject. Gamma camera detector heads, typically including a collimator, are placed adjacent to a surface of the subject to monitor and record emitted radiation. At least some known gamma camera detector heads are rotated around the subject to monitor the emitted radiation from a plurality of directions. The monitored radiation data from the plurality of directions is reconstructed into a three dimensional image representation of the radiopharmaceutical distribution within the subject.

Generally, the resolution of a gamma camera degrades with increasing distance between the imaged organ and the detector. Therefore, it is desirable to place the gamma camera as close as possible to the patient to facilitate minimizing the loss of resolution. At least some known imaging systems use non-circular orbits, such as oval or elliptical orbits to facilitate maintaining the detectors positioned close to the patient during a scan. However, a standard elliptical or oval shaped orbit may not follow the body contour of a patient as closely as possible.

BRIEF DESCRIPTION OF THE INVENTION

In one embodiment, a method of imaging a patient using an imaging system is provided. The method includes rotating a detector about a patient, detecting a predetermined distance of the detector from the patient, and automatically moving the detector to within a predetermined range of distance from the patient based on the detected distance.

In another embodiment, an imaging system for performing automatic body-contouring is provided. The system includes a gantry with a patient bore therethrough, a rotor rotatably coupled to the gantry wherein the rotor is configured to rotate about a longitudinal axis of the bore and wherein the rotor includes a transaxial movement assembly coupled to the rotor, and at least one detector revolvably coupled to the transaxial movement assembly, each at least one detector configured to revolve about an axis that is parallel to the longitudinal axis of the bore, the transaxial movement assembly is configured to translate each at least one detector in a transverse plane of rotation of the at least one detector.

BRIEF DESCRIPTION OF THE DRAWINGS

FIG. 9 is a table of sensor conditions that are used to control the automatic body-contouring method in accordance with an exemplary embodiment of the present invention.

DETAILED DESCRIPTION OF THE INVENTION

Figure 1:
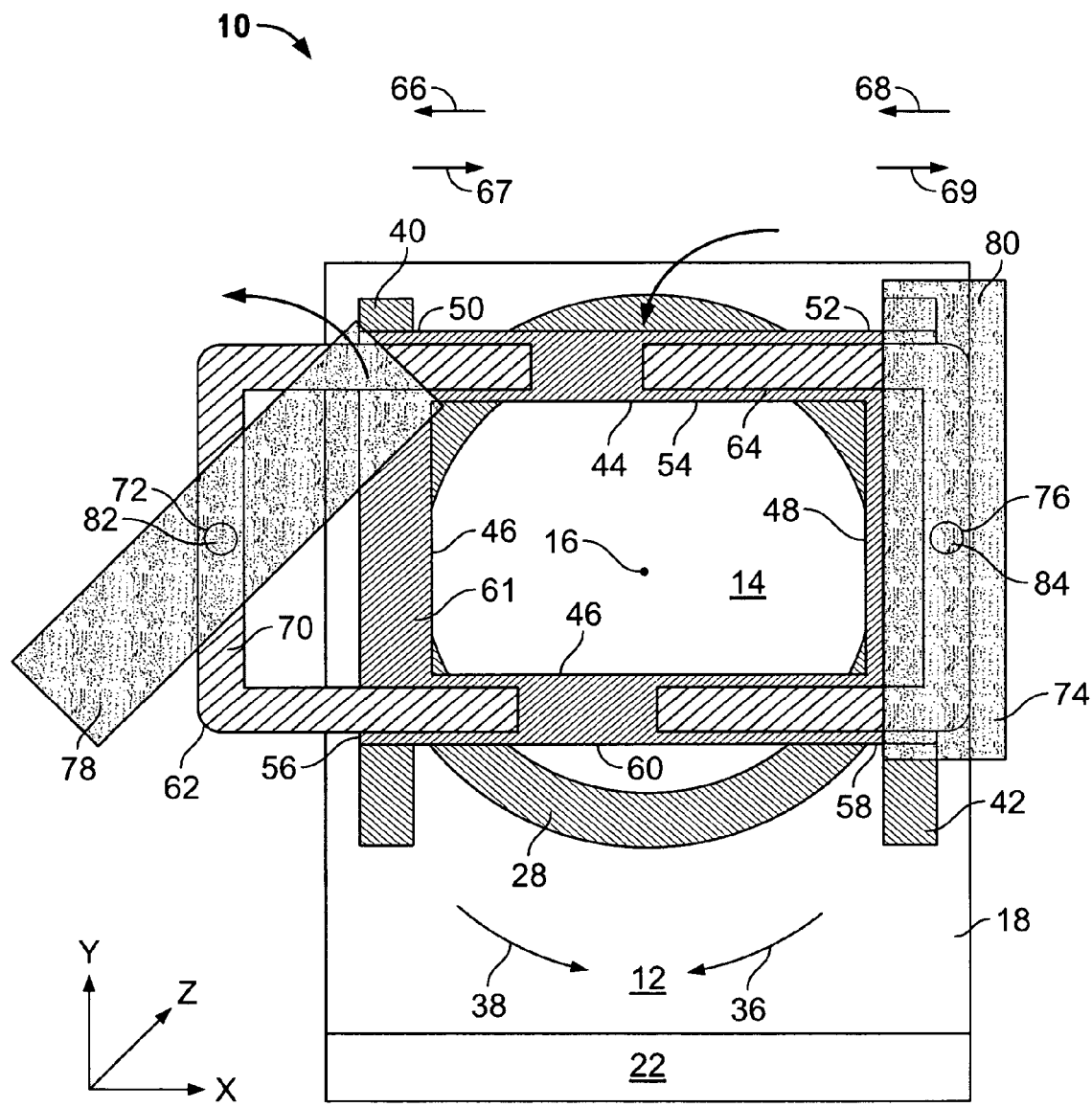
FIG. 1 is a front elevation view of a nuclear medicine imaging system in accordance with an exemplary embodiment of the present invention.
Figure 2:
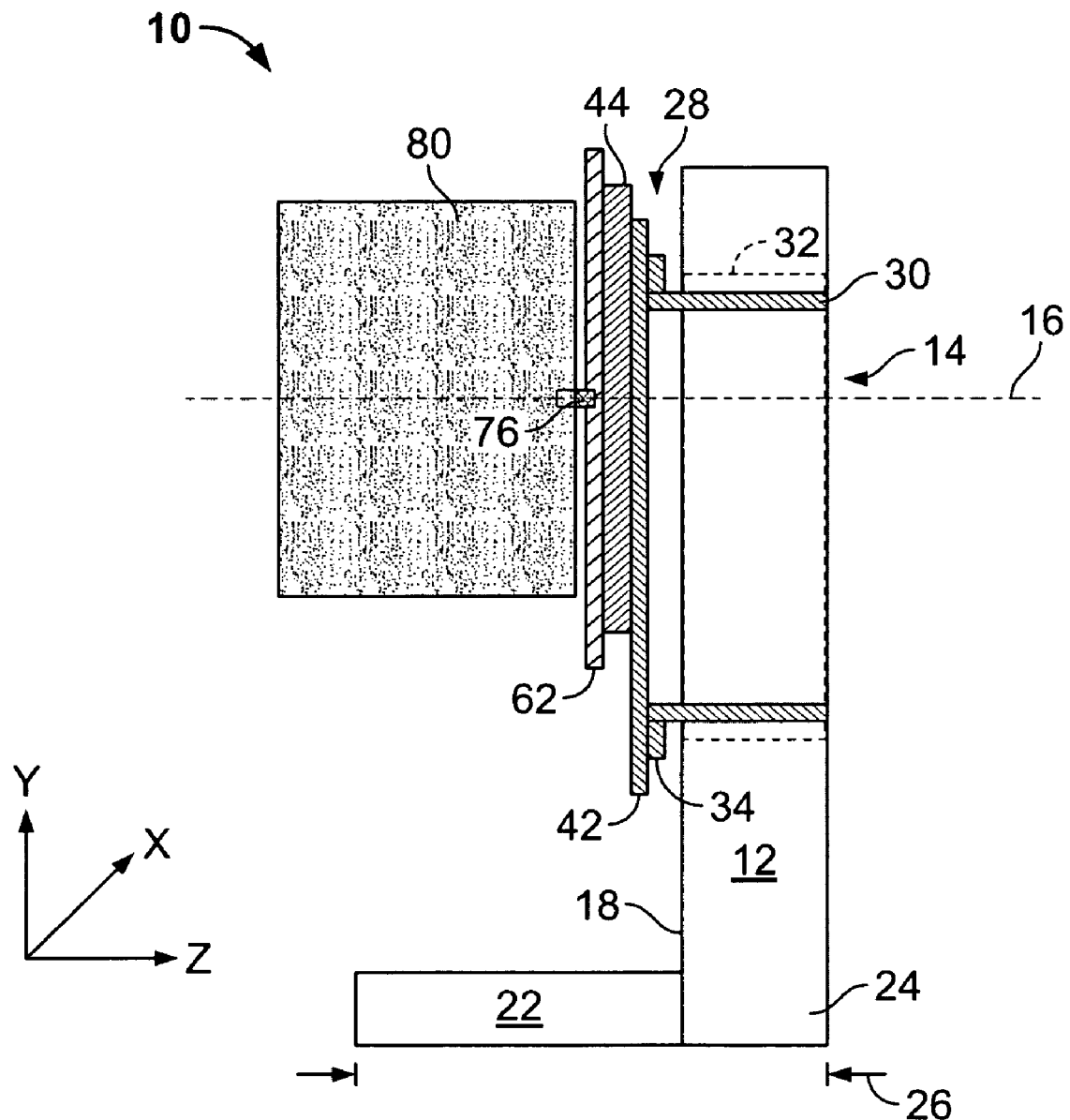
FIG. 2 is a side elevation view of the nuclear medicine imaging system shown in FIG. 1.

FIG. 1 is a front elevation view of a nuclear medicine imaging system 10 in accordance with an exemplary embodiment of the present invention. FIG. 2 is a side elevation view of nuclear medicine imaging system 10 shown in FIG. 1. System 10 includes a gantry 12 with a bore 14 therethrough. A longitudinal axis 16 of bore 14 is oriented substantially perpendicular to gantry 12. In the exemplary embodiment, bore 14 is circular and extends from a front side 18 of gantry 12 to a backside 20 of gantry 12. Gantry 12 includes a foot portion 22 extending orthogonally from a lower end 24 of gantry 12. Foot portion 22 is sized to provide gantry 12 with a stable platform such that a center of gravity of gantry 12 remains located within a footprint 26 of gantry 12.

A rotor 28 is rotatably coupled to gantry 12 adjacent to and/or within bore 14. Rotor 28 may include an annular portion coupled to an inner surface 32 of bore 14. Annular portion extends axially toward backside 20, at least partially into bore 14 and extends axially toward front side 18 to a mounting ring 34 of gantry 12. Rotor 28 is rotatable with respect to gantry 12 using, for example, a chain and sprocket drive coupled to a motor (not shown) internal to gantry 12, a rack and pinion configuration, and/or a worm and toothed gear arrangement. Rotor 28 may be rotatable in a clockwise (CW) direction 36 and a counter clockwise (CCW) direction 38 (as observed from a detector side of gantry 12), or may be rotatable in only one of directions 36 and 38 using slip rings and/or other wireless power and communication paths to transmit electrical power and communication and data signals between rotor 28 and gantry 12. Mounting ring 34 is fixedly coupled to annular portion 30, such that annular portion 30 and mounting ring 34 rotate together with respect to gantry 12. A first brace 40 and a second brace 42 may be fixedly coupled to mounting ring 34 substantially parallel with respect to each other and oriented along diametrically opposed, generally tangential positions along mounting ring 34.

A lateral frame 44 is translatably coupled to brace 40 and brace 42 through a first leg 46 and a second leg 48. A first end 50 of first leg 46 and a first end 52 of second leg 48 are coupled together through a first cross leg 54 and a second end 56 of first leg 46 and a second end 58 of second leg 48 are coupled together through a second cross leg 60. Lateral frame 44 is translatable through, for example, a screw drive, hydraulic and/or pneumatic piston or other linear actuator coupled between legs 46 and 48, and first and second braces 40 and 42, respectively. The extent of lateral translation of lateral frame 44 may be limited to prevent an inner periphery 61 of lateral frame 44 from approaching longitudinal axis 16.

A first radial member 62 is translatably coupled to cross legs 54 and 60. A second radial member 64 is translatably coupled to cross legs 54 and 60 in an opposed orientation to first radial member 62. First radial member 62 and second radial member 64 are independently translatable with respect to each other. Specifically, first radial member 62 is translatable in a Radial-1 out direction 66 and a Radial-1 in direction 67 concurrently with second radial member 64 being translatable in a Radial-2 in direction 68 and a Radial-2 out direction 69.

A base member 70 of first radial member 62 includes a pivot joint 72 and a base member 74 of second radial member 64 includes a pivot joint 76. A radiation detector, such as a gamma camera 78 may be rotatably coupled to pivot joint 72 and a radiation detector, such as a gamma camera 80 may be rotatably coupled to pivot joint 76. Pivot joint 72 permits gamma camera 78 to rotate about a longitudinal axis 82 of pivot joint 72 and pivot joint 76 permits gamma camera 80 to rotate about a longitudinal axis 84 of pivot joint 76. Gamma cameras 78 and 80 may be rotated manually and fixed in place before each imaging scan, or may be rotated automatically during any portion of an imaging scan using an actuator (not shown). Gamma cameras 78 and 80 may be fixed during an imaging scan. In the exemplary embodiment, gamma cameras 78 and 80 may each be configured to rotate approximately forty-five degrees with respect to alignment with legs 46 and 48, respectively, in direction 36 and direction 38. In an alternative embodiment, gamma cameras 78 and 80 may each be configured to rotate approximately ninety degrees in direction 36 and direction 38.

Lateral frame 44, first radial member 62, and second radial member 64 together form a transaxial movement assembly 86 that permits a rotation of gamma cameras 78 and 80 to be non-symmetric about longitudinal axis 16. Transaxial movement assembly 86 permits movement of cameras 78 and 80 to any position within the x, y plane during rotation of rotor 28 or with rotor 28 maintained in a viewing position.

Figure 3:
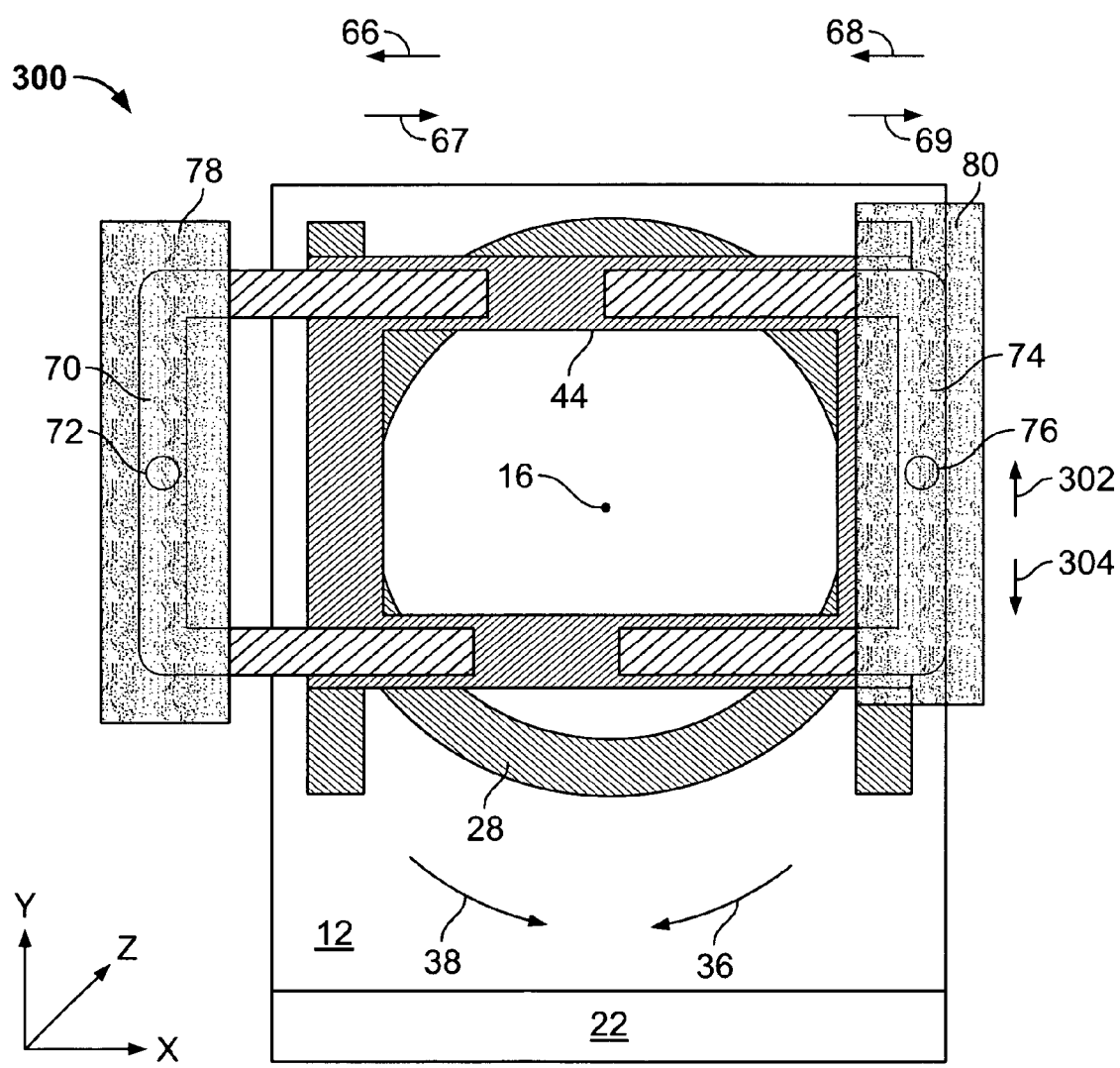
FIG. 3 is a front elevation view of the nuclear medicine imaging system shown in FIG. 1 provided in an H-mode configuration.

FIG. 3 is a front elevation view of nuclear medicine imaging system 10 (shown in FIG. 1) provided in an H-mode configuration 300. In H-mode configuration 300, gamma cameras 78 and 80 are oriented at zero degrees with respect to base members 70 and 74, respectively. Gamma cameras 78 and 80 have a plurality of degrees of freedom of movement with respect to longitudinal axis 16. Rotor 28 is rotatable in directions 36 and 38, lateral frame 44 is translatable in a lateral out direction 302 and a lateral in direction 304, first radial member 62 and second radial member 64 are independently translatable in directions 66, 67, 68 and 69, and gamma cameras 78 and 80 are rotatable about respective pivot joints 72 and 76.

Figure 4:
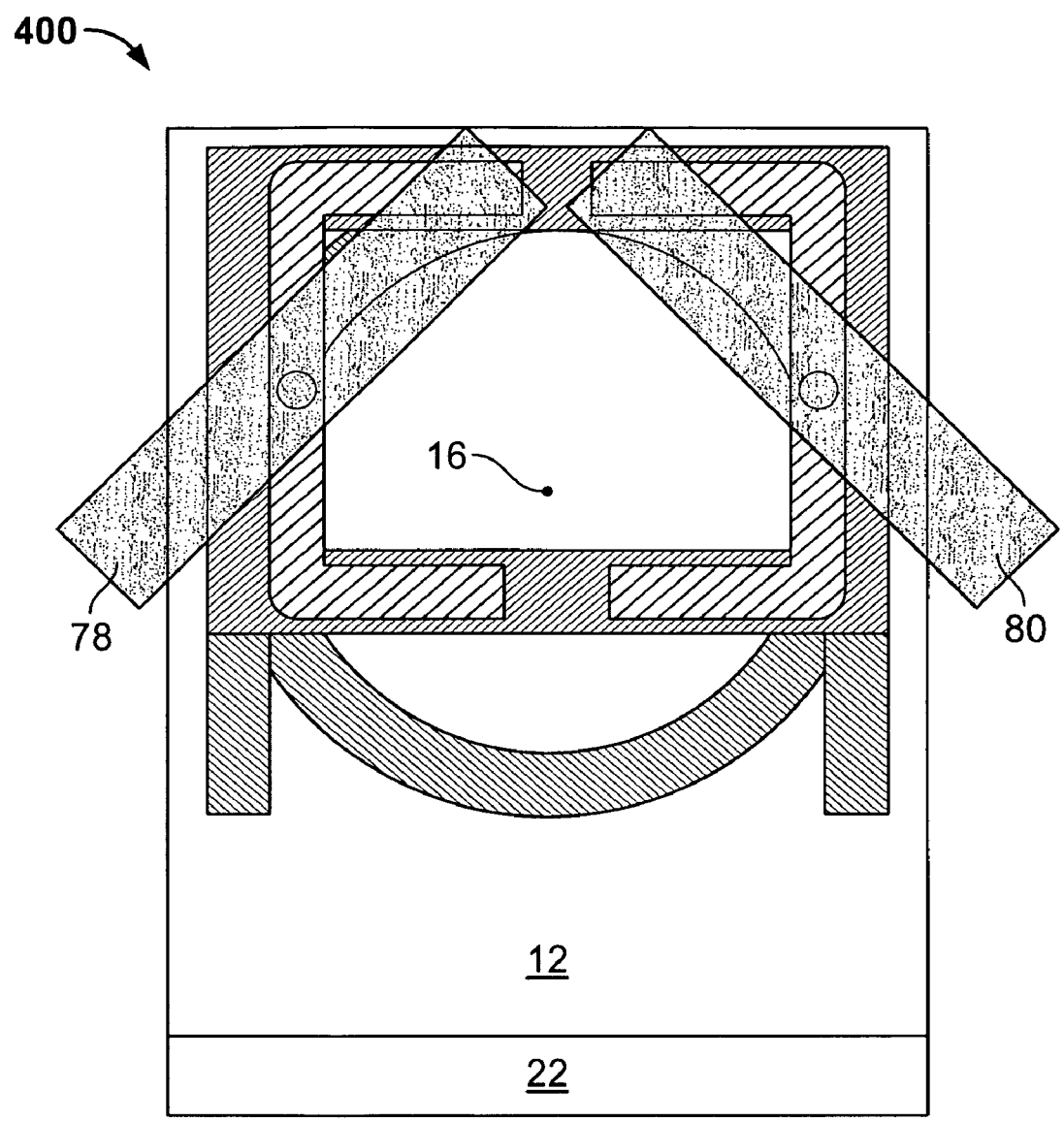
FIG. 4 is a front elevation view of the nuclear medicine imaging system shown in FIG. 1 provided in an L-mode configuration.

FIG. 4 is a front elevation view of nuclear medicine imaging system 10 (shown in FIG. 1) provided in an L-mode configuration 400. In L-mode configuration 400, nuclear medicine imaging system 10 may be used for a cardiac imaging scan wherein the gamma cameras are oriented orthogonally with respect to each other. Such orientation facilitates completing a one hundred eighty-degree data set collection by rotating gamma cameras 78 and 80 less then approximately one hundred eighty degrees about longitudinal axis 16.

Figure 5:
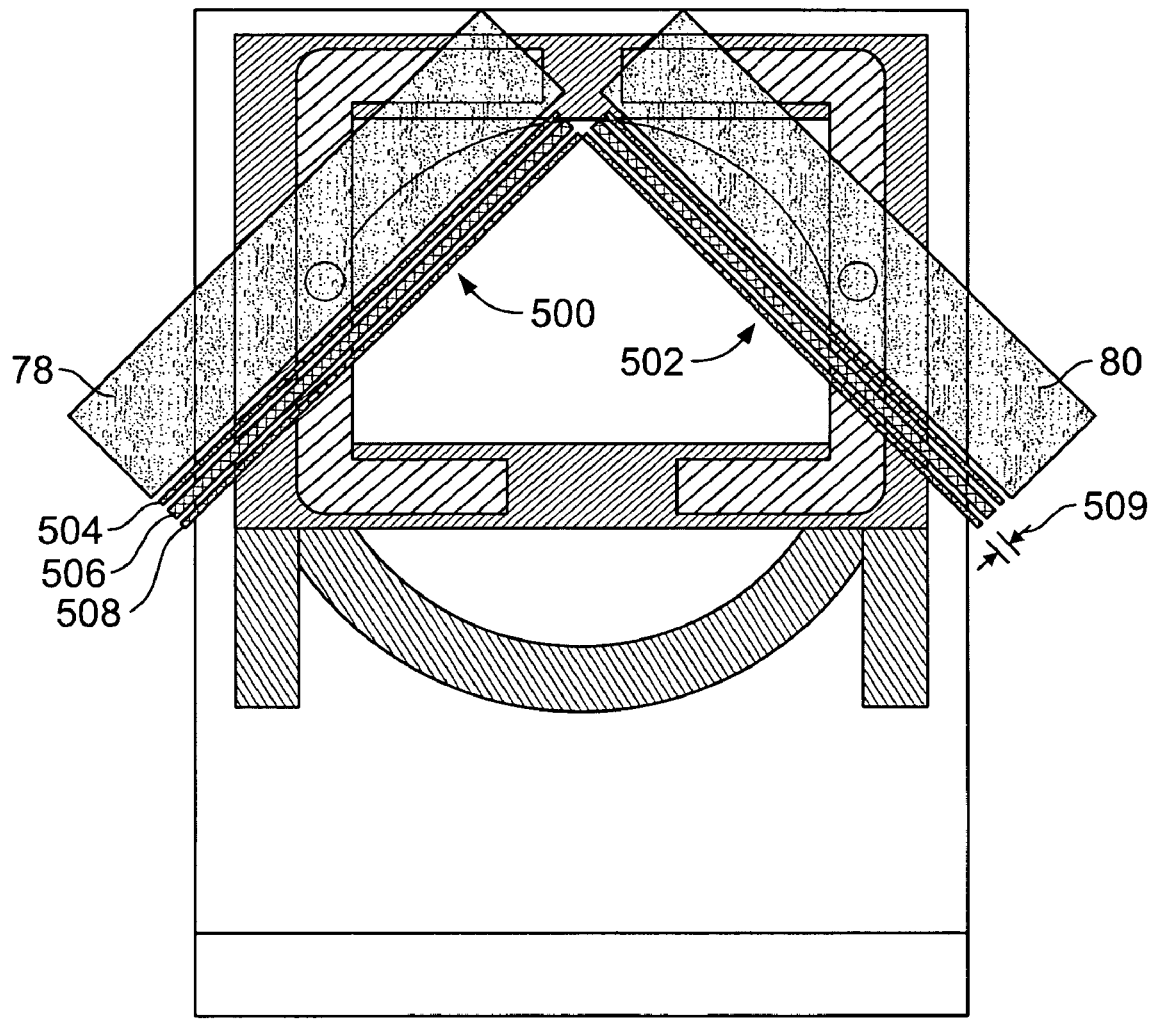
FIG. 5 is a front elevation view of another embodiment of the nuclear medicine imaging system shown in FIG. 1 provided for an L-mode configuration.

FIG. 5 is a front elevation view of nuclear medicine imaging system 10 (shown in FIG. 1) provided in an L-mode configuration 400. Imaging system 10 includes a first proximity sensor system 500 associated with gamma camera 78 and a second proximity sensor system 502 associated with gamma camera 80. In the exemplary embodiment, each proximity sensor system 500 and 502 includes three sensor elements. In alternative embodiments, proximity sensor systems 500 and 502 may include more or less than three sensor elements. A pressure sensitive safety device 504 of each proximity sensor system 500 and 502 may be configured to deactivate automatic control of moving parts of imaging system 10, for example rotor 28, lateral frame 44, first radial member 62 and second radial member 64, and the rotation of gamma cameras 78 and 80 about pivot joint 72 and pivot joint 76, respectively, when pressure sensitive safety device 504 contacts a subject (not shown in FIG. 5) being scanned. After pressure sensitive safety device 504 detects contact with the subject or other object, system 10 stops all moving parts of system 10. Thereafter, control of the moving parts may be restricted to manual control and motion that may bring gamma camera 78 nearer to the subject being scanned may be restricted, even in manual control, until contact between pressure sensitive safety device 504 and the subject is corrected.

A near proximity sensor 506 may be configured to stop the motion of moving parts in the direction toward the subject. In the exemplary embodiment, near proximity sensor 506 is a row of light emitting diodes (LED) and photo-diodes extending along opposite edges of the face of gamma cameras 78 and 80 that extend approximately one centimeter (cm) from pressure sensitive safety device 504. A far proximity sensor 508 may be configured to stop the motion of moving parts away from the subject. In the exemplary embodiment, near proximity sensor 506 and far proximity sensor 508 define a optimum distance range 509 to facilitate operation of gamma cameras 78 and 80. In the exemplary embodiment, far proximity sensor 508 is a row of LEDs and photo-diodes extending along opposite edges of the face of gamma cameras 78 and 80 that extend approximately two centimeters from pressure sensitive safety device 504. In an automatic body-contouring mode of operation, the movement of moving parts in a direction away from the subject is not stopped or restricted by near proximity sensor 506 and the movement of moving parts in a direction toward the subject is not stopped or restricted by far proximity sensor 508. Proximity sensor system 502 is configured similarly to proximity sensor system 500.

Figure 6:
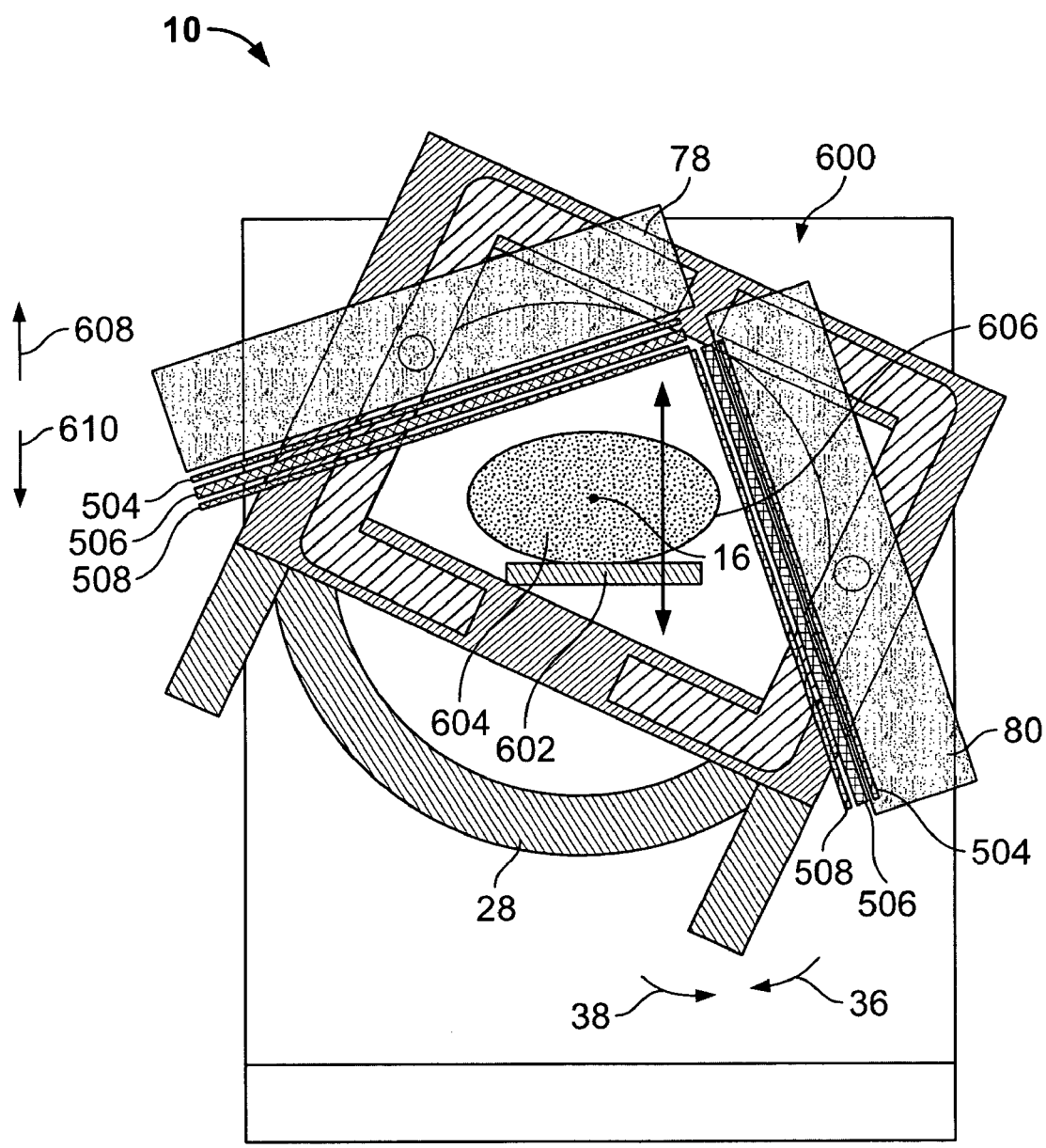
FIG. 6 is a front elevation view of the nuclear medicine imaging system shown in FIG. 1 in an exemplary one of a plurality of scan positions.

FIG. 6 is a front elevation view of nuclear medicine imaging system 10 (shown in FIG. 1) in an exemplary one of a plurality of scan positions 600. Imaging system 10 includes a patient table 602 upon which a subject to be scanned 604, for example a human patient, may be positioned. Subject 604 is generally positioned such that a region of interest 606, for example, a heart, is substantially aligned with longitudinal axis 16. To facilitate maintaining gamma cameras 78 and 80 in relatively near proximity to region of interest 606, patient table 602 may be configured to be moved in a table up direction 608 and a table down direction 610 with respect to gantry 12. Position 600 is illustrated with gamma cameras 78 and 80 oriented in L-mode configuration 400 and rotor 28 rotated in direction 36. As illustrated, none of the sensor elements of proximity sensor systems 500 and 502 are close enough to subject 604 to be actuated. Movement of patient table 602 may be subject to controls and restrictions similar to the moving parts of system 10 such that when pressure sensitive safety device 504 is actuated, motion of patient table 602 may be stopped and only permitted to move in a direction that moves subject 604 away from gamma cameras 78 and 80 using manual control and automatic control may be suspended.

During an imaging scan, for example, but not limited to a SPECT imaging scan, gamma cameras 78 and 80 may be controlled to rotate about the outer periphery of subject 604. The rotation may be controlled by controlling the rotation of rotor 28 and is generally controlled to provide step movement of approximately three degrees from one imaging position to the next. Accordingly, subject 604 may be viewed by gamma cameras 78 and 80 from a plurality of imaging positions extending, for example, one hundred eighty degrees, three hundred sixty degrees, or in continuous rotation about axis 16.

Specifically, when a three hundred sixty degree scan of subject 604 is performed, gamma cameras 78 and 80 may be set in H-mode configuration 300 (shown in FIG. 3) and rotor 28 is controlled to scan one hundred eighty degrees about subject 604. To utilize automatic body-contouring of subject 604 during a scan in H-mode configuration 300, patient table 602 may be substantially centered within bore 14 and maintained in such position during the scan. Lateral frame 44 may be positioned to a maximum extent of travel in lateral in direction 304, and Radial 1 and Radial 2 are used independently to facilitate achieving an optimal proximity of gamma cameras 78 and 80 with respect to subject 604.

Proximity sensor systems 500 and 502 detect the position of each gamma camera 78 and 80, respectively, with respect to subject 604 during the scan. Table 1 below illustrates the actions of the automatic body-contouring method for each possible state of near proximity sensor 506 and far proximity sensor 508 for each of proximity sensor systems 500 and 502.

TABLE 1

| State | Near proximity sensor 506 | Far proximity sensor 508 | Action |
|---|---|---|---|
| Near proximity | Blocked | Blocked | Move respective radial member out |
| OK | Not blocked | Blocked | Do not move |
| Far proximity | Not blocked | Not blocked | Move respective radial member in |
| Error | Blocked | Not blocked | Stop all motion, Report "error" |

For example, both of near proximity sensor 506 and far proximity sensor 508 for gamma camera 78 and/or gamma camera 80 being blocked indicates to system 10 that the respective gamma camera 78 and/or 80 is in near proximity with respect to subject 604. System 10 controls the respective first radial member 62 or second radial member 64 to move in the respective Radial-1 out direction 66 and Radial-2 out direction 69. A state of near proximity sensor 506 and far proximity sensor 508, in which neither near proximity sensor 506 nor far proximity sensor 508 are blocked indicates to system 10 that respective gamma camera 78 and/or 80 is in far proximity with respect to subject 604. System 10 then controls the respective first radial member 62 or second radial member 64 to move in the respective Radial-1 in direction 67 and Radial-2 in direction 68. A state in which near proximity sensor 506 is not blocked and far proximity sensor 508 is blocked indicates to system 10 that the respective gamma camera 78 and 80 are positioned within distance range 509 from subject 604. System 10 then may begin data collection from gamma cameras 78 and 80 from the view to which rotor 28 is rotated.

Figure 7:
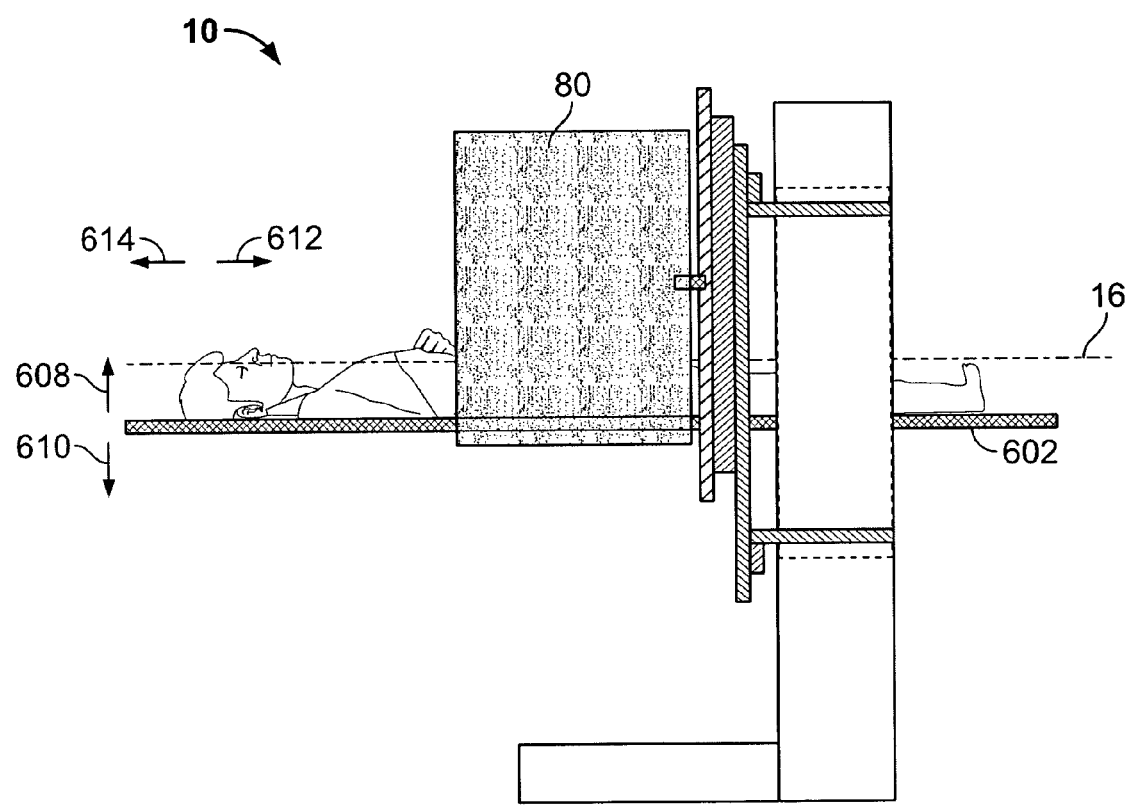
FIG. 7 is a side elevation view of the nuclear medicine imaging system shown in FIG. 6.

FIG. 7 is a side elevation view of nuclear medicine imaging system 10 (shown in FIG. 6). Patient table 602 also may be configured to be moved in a direction parallel to longitudinal axis 16 such as a table in direction 612 and a table out direction 614 with respect to gantry 12.

Figure 8:
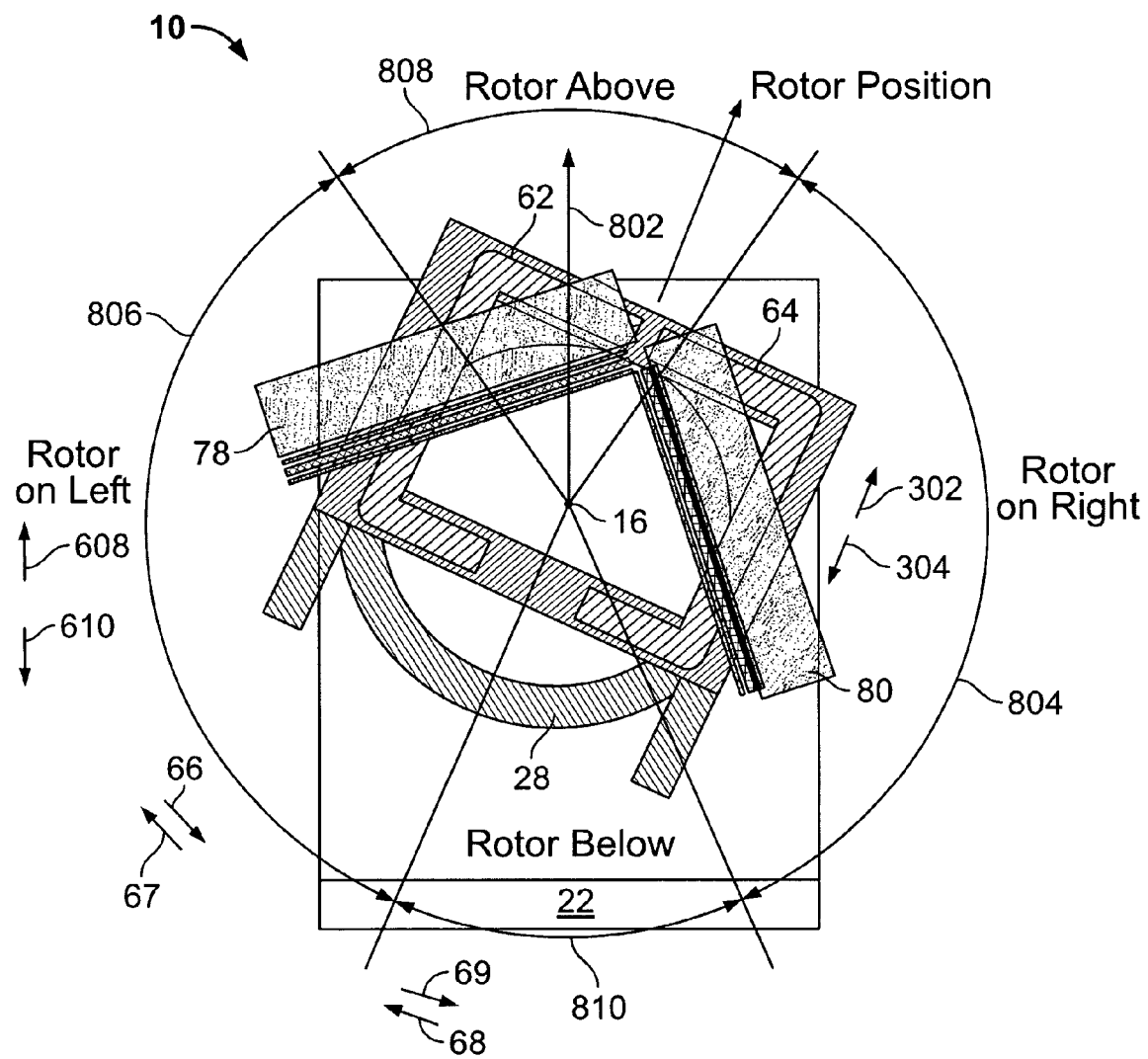
FIG. 8 is a front elevation view of gamma cameras oriented in an L-mode configuration in a first exemplary scan position in accordance with an embodiment of the present invention.

FIG. 8 is a front elevation view of nuclear medicine imaging system 10 (shown in FIG. 1) provided in L-mode configuration 400. In the exemplary embodiment, gamma cameras 78 and 80 are configured to pivot independently and first radial member 62 and second radial member 64 are configured to translate in and out independently. A reference axis 802 is selected to point away from foot portion 22 and pass through longitudinal axis 16. Positions of rotor 28 rotation from axis 802 may be referenced from reference axis 802. The rotation of rotor 28 may be divided into a plurality of sectors for providing input to the automatic body-contouring method. The method then may modify its output with respect to the position of rotor 28. It should be noted that the division of the rotor position to sectors may be divided in other than ninety-degree sections and may be other than symmetric sections. The sectors include a rotor on right sector 804, a rotor on left sector 806, a rotor above sector 808, and a rotor below sector 810.

The plurality of degrees of freedom of movement permitted by system 10 allows the automatic body-contouring method to control three independent motions in L-mode configuration 400. Table up direction 608, table down direction 610, lateral out direction 302, lateral in direction 304, Radial-1 out direction 66, Radial-1 in direction 67, Radial-2 in direction 68, and Radial-2 out direction 69 may be controlled independently with respect to each other. Movement of first radial member 62 and second radial member 64 in combination moves gamma cameras 78 and 80 in a direction that is perpendicular to the movement in the lateral in or lateral out direction. For example, gamma cameras 78 and 80 may be moved sideways right by combining Radial-1 in direction 67 and Radial-2 out direction 69. Similarly, gamma cameras 78 and 80 may be moved sideways left by combining Radial-1 out direction 66, and Radial-2 in direction 68. Table up direction 608 and table down direction 610 may be used only when at least one of lateral movement and radial movement has reached a travel limit. Limiting table motion to a minimum amount necessary to accomplish automatic body-contouring is provided, for example, for patient comfort during a scan. The motions further can be combined to perform motion of gamma cameras 78 and 80 that are parallel to the face of one of gamma cameras 78 and 80. For example, equal rate motion in lateral out direction 302 in combination with sideways right movement results in the face of gamma camera 78 remaining at substantially the same distance from subject 604 while gamma camera 80 moves away from subject 604. This motion may be referred to as, gamma camera 80—Away. Similarly, lateral in direction 304 and a sideways left movement in combination may be referred to as gamma camera 78—towards. Similar motions may be combined to define a gamma camera 78 away and towards movement.

Sensor systems 500 and 502 indications for each respective gamma camera may be summarized as shown in Table 2 below.

TABLE 2

| State | Near proximity sensor 506 | Far proximity sensor 508 | Indication | Action |
|---|---|---|---|---|
| Near proximity | Blocked | Blocked | Near proximity | Move respective radial member out |
| OK | Not blocked | Blocked | Best proximity | Do not move |
| Far proximity | Not blocked | Not blocked | Far proximity | Move respective radial member in |
| Error | Blocked | Not blocked | Error | Stop all motion, Report "error" |
| Error | Any | Any | Error Pressure Sensitive Safety Device 504 Activated | Stop all motion, Report "error" |

When any of sensors 506, 508, or pressure sensitive safety device 504 indicates "Error", movement stops and only motion away from subject 604 is permitted. Each motion axis includes a limit switch (not shown), indicating an end of travel (except for the rotation of rotor 28). For example, the limit switches associated with travel in Radial-1 in and out directions 66 and 67, and Radial-2 in and out directions 68 and 69 will limit the sideways motion described above.

The automatic body-contouring method also may include a hierarchy of motions, for example, when at least one of gamma cameras 78 and 80 is in near proximity, the automatic body-contouring method initiates a motion that attempts to move the gamma camera to an OK state wherein the face of the gamma camera is within distance range 509 with respect to subject 604. If a travel limit is reached while attempting to move the gamma camera into the OK state, the automatic body-contouring method initiates a motion that attempts to move patient table 602 to a position that positions the gamma camera into the OK state. If at least one of gamma cameras 78 and 80 is in far proximity (and the other gamma camera is not in near proximity), the automatic body-contouring method initiates a motion that attempts to move the gamma camera to an OK state. If a travel limit is reached while attempting to move the gamma camera into the OK state, the automatic body-contouring method initiates a motion that attempts to move patient table 602 to a position that positions the gamma camera into the OK state. If both gamma cameras 78 and 80 are in an OK state, the automatic body-contouring method does not initiate motion to move gamma cameras 78 and 80 with respect to subject 604.

If any of any of sensors 506, 508, or pressure sensitive safety device 504 are in an "Error" state, or travel limits have been reached, such that no motion is permitted, the automatic body-contouring method stops all motion (including rotor rotation) and an alarm, such as an audible or visual alarm, may be activated. During any movements, moving gamma cameras 78 and 80 away from subject 604, for example, due to a gamma camera being in a near proximity position with respect to subject 604, takes priority over moving gamma cameras 78 and 80 towards subject 604, for example, due to a gamma camera being in a far proximity position with respect to subject 604.

FIG. 9 is a table 900 of sensor conditions that are used to control the automatic body-contouring method. Table 900 includes a line reference number column 902 that identifies a set of indications from the sensors of system 10 and a corresponding action command that is transmitted by the automatic body-contouring method to control the speed and direction of the moving parts of system 10. Table 900 may be stored in a look-up table in a memory of a motion controller portion (not shown) of system 10 that receives indications of the proximity of gamma cameras 78 and 80 to subject 604 and processes instructions to transmit commands that control the moving parts of system 10. Table 900 also includes, a column 904, a column 906, a column 908 and a column 910 that each identify a state of sensor system 500, sensor system 502, the rotor position encoder, and the travel limit switches, respectively. A column 912 identifies the automatic body-contouring method action for movement of gamma cameras 78 and 80, and a column 914 identifies the automatic body-contouring method action for movement of patient table 602 for the respective states of the sensors. For example, line 1 of table 900 illustrates the state wherein both sensor systems 500 and 502 indicate that gamma cameras 78 and 80 are within distance range 509 from subject 604. Rotor position is in a DON'T CARE state and the travel limits are also in a DON'T CARE state. For this set of states, the automatic body-contouring method will not attempt to move gamma cameras 78 and 80 or table 602. As another example, line 4 indicates a set of states wherein gamma camera 78 is within distance range 509 from subject 604, gamma camera 80 is in near proximity to subject 604, rotor position is in a DON'T CARE state and there are no travel limit switches activated. Under these conditions, the automatic body-contouring method initiates movement commands that move gamma camera 80 away from subject 604, and does not move table 602. Other lines of table 900 illustrate the output of the automatic body-contouring method for various combinations of inputs from sensor system 500, sensor system 502, the rotor position encoder, and the travel limit switches. The rotation of rotor 28 from a scanning position to a next scanning position may cause any of the various inputs to change between scanning positions, such that gamma cameras 78 and 80 circumscribe a path extending from subject 604 that is a distance away from subject 604 that corresponds to the settings of near proximity sensor 506 and far proximity sensor 508.

During continuous rotation of rotor 28, for example, when a continuous scan mode is selected, the automatic body-contouring method continuously controls the movement of the moving parts of system 10, including blocking the motion of rotor 28. For example, when a "step and shoot" scan mode is selected, rotor 28 rotates a predetermined number of degrees between each view position, for example, approximately one degree to approximately four degrees, and stops rotation for a predetermined period, such as, approximately five seconds to approximately thirty seconds, or for a predetermined number of gamma camera counts, to acquire data from a view.

In one embodiment, system 10 controls movement of first radial member 62 or second radial member 64 and lateral frame 44 to initiate movement away from subject 604 during rotation of rotor 28. When the rotation stops, the automatic body-contouring method may then permit the movement of first radial member 62, second radial member 64 and lateral frame 44 towards subject 604 to achieve a best proximity position and stop for the duration of the view acquisition. In a further embodiment, when the rotation is stopped, the automatic body-contouring method may be configured to move gamma cameras 78 and 80 in only the away directions such that gamma cameras 78 and 80 do not follow the breathing of subject 604, but will maintain best proximity for the inhale patient posture.

System 10 also may include position encoders (not shown) for each of rotor 28, lateral frame 44, first radial member 62 or second radial member 64, pivot joints 72 and 76, and patient table 602. The automatic body-contouring method may transmit gamma cameras 78 and 80 configuration and position based on the encoders for each degree of freedom to an acquisition processor (not shown) within system 10 or located remotely. Gamma camera 78 and 80 configuration and position may be used to determine a relative direction of detected photons to coordinates of subject 604. For example, in one embodiment, gamma camera 78 and 80 configuration and position is transmitted to the acquisition processor periodically, for example, every ten milliseconds. In an alternative embodiment, only gamma camera 78 and 80 configuration and position changes are transmitted. In another embodiment, patient table 602 position may be programmed for a predetermined location depending on a type of scan to be performed. For example, different home or starting positions of patient table 602 for a child, a head, an adult, and an obese patient may be preset and selected when desired by the operator. Moreover, subject contour information facilitates improving image reconstruction. For example, the position encoders may transmit gamma camera location information to an image, reconstruction method such that positional errors may be reduced during reconstruction.

It is contemplated that the benefits of the various embodiments of the present invention accrue to all imaging systems, such as, for example, but not limited to, nuclear medicine imaging systems, PET, SPECT and dual-modality imaging systems.

The above-described embodiments of automatic body-contouring imaging systems provide a cost-effective and reliable means for examining a patient. More specifically, the imaging system includes a plurality of gamma cameras each having multiple degrees of freedom of movement, such that, during a scan, the gamma cameras may be automatically controlled to contour the body of a patient or subject to reduce the distance between the region of interest and the gamma camera sensitive face. As a result, an imaging system is provided that facilitates improving the resolution of the gamma cameras.

Exemplary embodiments of automatic body-contouring imaging systems are described above in detail. The automatic body-contouring imaging system components illustrated are not limited to the specific embodiments described herein, but rather, components of each automatic body-contouring imaging system may be utilized independently and separately from other components described herein. For example, the automatic body-contouring imaging system components described above may also be used in combination with other imaging systems.

A technical effect of the systems and methods described herein includes facilitating minimizing the distance between an organ of interest and an imaging system detector during an automatic imaging scan of a subject, and therefore facilitating reducing operator input to the scanning procedure and reducing the time necessary to perform a scan while improving the resolution of the imaging system.

While the invention has been described in terms of various specific embodiments, those skilled in the art will recognize that the invention can be practiced with modification within the spirit and scope of the claims.

What is claimed is:

1. A method of imaging a patient using an imaging system, said method comprising:
   rotating a plurality of detectors about a patient;
   detecting a predetermined distance of at least one of the detectors from the patient; and
   automatically moving at least one of a patient table and the at least one detector such that the at least one detector is within a predetermined range of distance from the patient based on the detected distance and based on a predetermined hierarchy of movements for at least one of the patient table and the at least one detector.

2. A method in accordance with claim 1 wherein said rotating a plurality of detectors about a patient comprises at least one of rotating the plurality of detectors continuously about the patient and rotating the plurality of detectors incrementally about the patient.

3. A method in accordance with claim 1 wherein said rotating a plurality of detectors about a patient comprises rotating two detectors that are oriented parallel with respect to each other and positioned diametrically opposed with respect to each other about a longitudinal axis of the imaging system.

4. A method in accordance with claim 1 wherein said rotating a plurality of detectors about a patient comprises rotating two detectors that are substantially orthogonally oriented with respect to each other about a longitudinal axis of the imaging system.

5. A method in accordance with claim 1 wherein each of said detectors comprise a proximity sensor system that includes at least one of a near proximity sensor, a far proximity sensor, and a safety switch, and wherein said detecting a predetermined distance of at least one of the detectors to the patient comprises:
   transmitting a first signal representative of a far proximity condition when the near proximity sensor and the far proximity sensor do not detect the patient;
   transmitting a second signal representative of an OK proximity status when the near proximity sensor does not detect the patient and the far proximity sensor does detect the patient;
   transmitting a third signal representative of a near proximity condition when the near proximity sensor detects the patient and the far proximity sensor detects the patient; and
   transmitting a fourth signal representative of an error condition when at least one of the near proximity sensor does not detect the patient and the far proximity sensor does detect the patient, and the safety switch detects the patient.

6. A method in accordance with claim 1 wherein said imaging system includes a gantry circumscribing a patient bore, the gantry including a transaxial movement assembly to position the detector to any position in a plane perpendicular to a longitudinal axis of the patient bore, and wherein said rotating a plurality of detectors about a patient comprises:
   automatically moving the at least one detector transaxially away from the patient when a near proximity sensor does detect the patient;
   automatically moving the at least one detector transaxially toward the patient when a far proximity sensor does not detect the patient; and
   automatically stopping movement of the transaxial movement assembly when a safety switch detects the patient.

7. A method in accordance with claim 1 wherein automatically moving the at least one of the patient table and the at least one detector based on the predetermined hierarchy of movements comprises moving the patient table instead of the at least one detector if a travel limit of the at least one detector has been reached.

8. A method in accordance with claim 1 wherein automatically moving the at least one of the patient table and the at least one detector based on the predetermined hierarchy of movements comprises moving a first detector away from the patient instead of moving a second detector toward the patient.

9. A method in accordance with claim 1 wherein the predetermined hierarchy of movements is stored in a memory.

10. A method in accordance with claim 1 wherein the predetermined hierarchy of movements defines a priority of the movements relative to each other based on at least one predetermined condition.

11. A method of imaging a patient using an automatic body-contouring imaging system, said method comprising:
   rotating a detector about a longitudinal axis of a patient viewing area;
   sensing a distance range between the detector and at least one of an object that is proximate the viewing area and the patient; and
   moving at least one of a patient table and the detector using the sensed distance range and based on a predetermined hierarchy for movements of at least one of the patient table and the detector, such that a face of the detector circumscribes the patient for a predetermined angular displacement at a substantially uniform distance between the face of the detector and the patient.

12. A method in accordance with claim 11 wherein said rotating a detector about a longitudinal axis of a patient viewing area comprises rotating the detector at least one of continuously and rotating the detector in predetermined angular increments.

13. A method in accordance with claim 12 wherein said rotating the detector in predetermined angular increments about a longitudinal axis of a patient viewing area comprises rotating the detector in increments of between about one degree and about four degrees.

14. A method in accordance with claim 11 wherein said rotating a detector about a longitudinal axis of a patient viewing area comprises rotating two detectors substantially diametrically opposed with respect to each other across the patient viewing area.

15. A method in accordance with claim 11 wherein said rotating a detector about a longitudinal axis of a patient viewing area comprises rotating two detectors substantially orthogonally oriented and adjacent with respect to each other.

16. A method in accordance with claim 11 wherein said sensing a distance range between the detector and at least one of an object that is proximate the viewing area and the patient comprises sensing at least one of a near proximity distance and a far proximity distance between the face of the detector and the patient.

17. A method in accordance with claim 11 wherein a distance between a near proximity distance and a far proximity distance defines said substantially uniform distance between the face of the detector and the patient and wherein said rotating a detector about a longitudinal axis of a patient viewing area comprises controlling a transaxial movement of the detector such that the detector circumscribes the patient at said substantially uniform distance.

18. A method in accordance with claim 11 further comprising displacing the patient relative to the longitudinal axis to maintain the substantially uniform distance.

19. An imaging system for performing automatic body-contouring, said system comprising:
   a gantry with a patient bore therethrough;
   a rotor rotatably coupled to said gantry, said rotor configured to rotate about a longitudinal axis of said bore, said rotor comprising:
   a transaxial movement assembly coupled to said rotor, said transaxial assembly configured to move at least one detector in at least one of a lateral out direction, a lateral in direction, a radial out direction, and a radial in direction with respect to said rotor based on a predetermined hierarchy of movements for at least one of a patient table and the at least one detector;
   said at least one detector revolvably coupled to said transaxial movement assembly, each of said at least one detector configured to revolve about an axis that is parallel to said longitudinal axis of said bore, said transaxial movement assembly configured to translate each of said at least one detector in a transverse plane of rotation of the said at least one detector.

20. An imaging system in accordance with claim 19 wherein said transaxial movement assembly comprises:
   a lateral translation member coupled to said rotor, said lateral translation member configured to move in a first axis that is orthogonal to the longitudinal axis, and
   a radial translation member coupled to said rotor, said radial translation member configured to move in a second axis that is orthogonal to the longitudinal axis and the first axis.

21. An imaging system in accordance with claim 20 wherein said lateral translation member is configured to translate said at least one detector in said lateral out direction with respect to said rotor and said lateral in direction with respect to said rotor, said lateral in direction being opposite to said lateral out direction.

22. An imaging system in accordance with claim 20 wherein said radial translation member is configured to translate said at least one detector in a Radial-1 out direction with respect to said rotor and a Radial-1 in direction with respect to said rotor, said Radial-1 in direction opposite said Radial-1 out direction.

23. An imaging system in accordance with claim 19 further comprising a patient table configured to move in a table up direction and a table down direction, said table up direction opposite said table down direction.

24. An imaging system in accordance with claim 19 wherein each said at least one detector is configured to revolve 180 degrees with respect to said transaxial movement assembly.

\* \* \* \* \*